April 16, 1957      B. GMÜR      2,788,922
DEVICE FOR MIXING AND DISCHARGING BULK MATERIALS
Filed Jan. 25, 1955
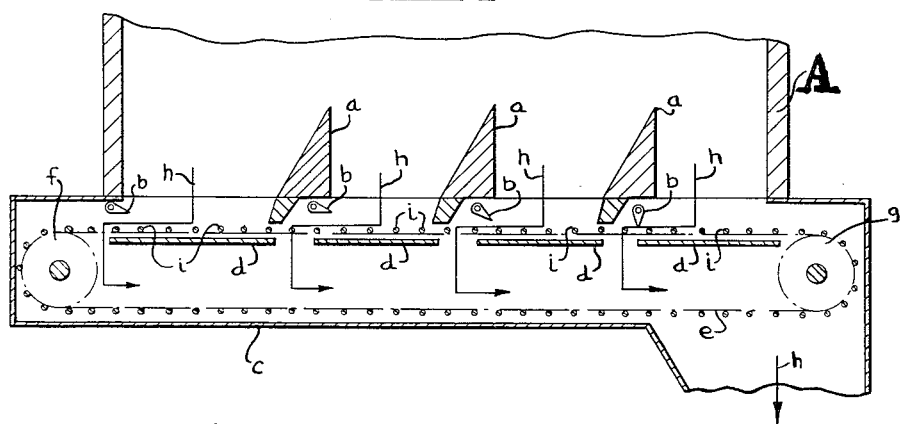
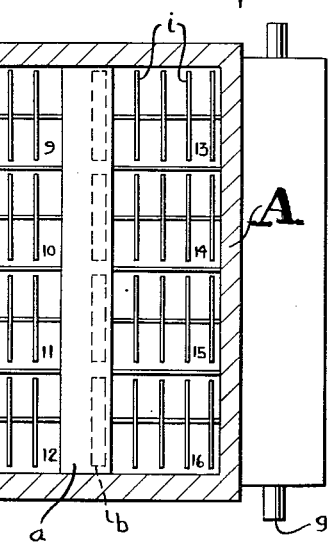
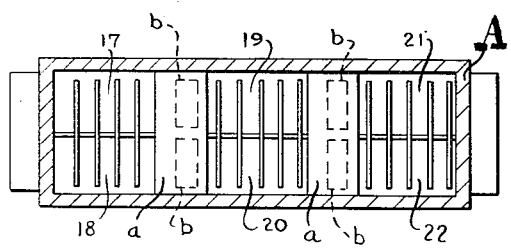

United States Patent Office 2,788,922
Patented Apr. 16, 1957

2,788,922
DEVICE FOR MIXING AND DISCHARGING BULK MATERIALS

Bruno Gmür, St. Gallen, Switzerland, assignor to Gebrueder Buehler, Uzwil, Switzerland Application January 25, 1955, Serial No. 484,008

Claims priority, application Germany February 6, 1954

3 Claims. (Cl. 222—270)

The invention relates to a device for mixing and discharging bulk materials, for instance, flour from silos and bunkers.

In the known installations of this type a plurality of adjacently located conveyor chains are located beneath the silos or bunkers and the mixing of the bulk materials is effected by the application of a different speed to the conveyor chains, by the on-and-off switching of the chain drive or by the provision of a different spacing between cross bars which are fastened to the conveyor chains.

These devices have the disadvantage that the discharge may only be varied by a change of the operative speed of the chains or by a change of the spaces between the cross bars; consequently, a mixing of the charge can only take place in a direction transverse to the direction of the movement of the chains; since this movement due to constructional as well as economical reasons always takes place in the longitudinal direction of the operating cells or compartments of the silos the mixing of the charge only takes place in the transverse direction of these cells or working compartments.

It is the main object of the invention to eliminate this disadvantage.

With this object in view the invention provides one or a plurality of adjacent discharge chains and the bottom portion of the silo compartment or bunker harboring these chains is divided in its longitudinal and in its crosswise direction into discharge panels, the cross section of each discharge panel being adjusted in conformity with the quantity of materials to be discharged from the same. Each compartment panel is provided with a device to adjust and to vary the discharge cross section. This dosing device preferably consists of rotary discharge valves; it permits to vary the discharge independently from the individual silo compartment in the longitudinal and in the cross direction of the silo cells; therefore, the discharge capacity may be varied in a simple manner without a variation of the driving speed.

The invention will now be described more in detail and with reference to the attached drawings, wherein Fig. 1 is a vertical sectional view of the bottom portion of a silo compartment including the discharging means for the treated materials;

Fig. 2 is a top view thereof; and

Fig. 3 is a top view of a further embodiment of the invention.

The bottom portion of the rectangular silo compartment A is divided by wedge-shaped members $a$ into a plurality of separate discharge zones 1 to 16. A further subdivision of the bottom portion of the silo compartment into discharging panels 1 to 16 is created by the provision of several conveyor chains $e$ which are located side by side in the transverse direction of compartments A; the running direction of the chains coincides with the longitudinal direction of the silo compartment.

The width of the discharging panels 1 to 16 practically coincides in this case with the length of the cross bars $i$ of the discharging or conveyor chains $e$. These chains are supported by the driving pulley $g$ and the return pulley $f$, the pulleys being mounted in discharge trough $c$.

A number of intermediate floors $d$ are provided beneath the exit openings from the silo compartment A which floors prevent the direct downward drop of the materials to be discharged.

The discharge of the materials from the individual discharge panels is controlled by rotatable discharge devices $b$ which are shaped as flap valves and shown in the drawing in different discharge control positions; in this manner the mixing action and the discharge from each panel may be adjusted.

The length of the flap valves $b$ is substantially equal to the length of the cross bars $i$ of the discharging chains.

The flow direction of the discharged materials is indicated by the arrows $h$.

The materials are entrained by the cross bars $i$ at a speed controlled by the conveyor chains $e$. The thickness of the material layer entrained in each panel is controlled by the position of the flap valves $b$. The materials drop hereafter through openings in the intermediate floors $d$ into the discharge $c$, where they are mixed and from which they are transported by the lower portion of the conveyor chains $e$.

The flap valves $b$ may be connected with a central control station, for instance, by levers or rods and preferably in such a manner that their axes may be adjusted in conformity with the desired mixing action independently from each other and that the desired discharge action can be controlled by a simultaneous displacement of all flap valves.

With the embodiment of the invention shown in Fig. 3 only one discharge chain is used, the bottom of the silo being divided into discharge panels 17 to 22 in the longitudinal direction by the wedge-shaped members $a$ and in the transverse direction by the length of the flap valves $b$. In this case the length of the flap valves controls the width of the discharge panels.

Since certain changes may be made in the above device and different embodiments of the invention could be made without departing from the scope thereof, it is intended that all matter contained in the above description or shown in the accompanying drawing shall be interpreted as illustrative and not in a limiting sense.

It is accordingly desired that in construing the breadth of the appended claims they shall not be limited to the specific exemplifications of the invention described herein.

Having thus described the invention, what I claim as new and desire to be secured by Letters Patent, is as follows:

1. A device for discharging bulk materials such as flour from a silo compartment comprising at least one horizontally operative chain for the discharge of said materials from said silo compartment, said chain being located in the bottom portion of said compartment, said bottom portion being sub-divided into a plurality of successive discharge panels extending in the longitudinal and in the cross direction of said silo compartment, means to control the quantity of the bulk materials to be discharged from said individual panels, a plurality of wedge-shaped members dividing the discharge surface of said silo compartment along its longitudinal direction into individual discharge zones, the latter being further divided by said discharge control means into panels, a plurality of adjacent discharging chains and cross bars fastened to said chains, the width of the discharge panels substantially coinciding with the length of said cross bars.

2. A device for discharging bulk materials such as flour from a silo compartment, comprising at least one horizontally operative chain having an upper and a lower flight for the discharge of the said materials from said silo compartment, said chain being located in the bottom portion of said compartment, said bottom portion being subdivided into a plurality of adjacent discharging panels extending in the longitudinal and in the cross direction of said silo compartment, means to control the quantity of the bulk materials to be discharged from each of said individual panels, a plurality of wedge-shaped members dividing the discharging surface of said silo compartment along its longitudinal direction into individual discharging zones, the latter being further divided by said controlling discharging means into said panels.

3. In a device according to claim 2, a plurality of adjacently located discharging chains, cross bars to support said chains, the length of the discharge controlling means and accordingly the width of the discharge panels substantially coinciding with the length of the cross bars of said discharging chains.

References Cited in the file of this patent

UNITED STATES PATENTS

| 258,190 | Worrest | May 16, 1882 |
| 1,070,798 | Green et al. | Aug. 19, 1913 |
| 1,170,804 | Dunham | Feb. 8, 1916 |
| 1,977,513 | Holbeck | Oct. 16, 1934 |
| 2,111,663 | Greamiger | Mar. 22, 1938 |
| 2,412,121 | Bradshaw | Dec. 3, 1946 |
| 2,519,929 | Redler | Aug. 22, 1950 |